3,574,536
SODIUM ALUMINUM PHOSPHATE COMPOUNDS
Reginald E. Vanstrom, Dobbs Ferry, N.Y., assignor to Stauffer Chemical Company, New York, N.Y.
No Drawing. Filed June 26, 1968, Ser. No. 740,082
Int. Cl. C01b 25/30; A21d 2/00
U.S. Cl. 23—107                            3 Claims

ABSTRACT OF THE DISCLOSURE

A crystalline sodium aluminum acid orthophosphate is provided by reacting an alkali metal compound with an inorganic aluminum compound and a dilute solution of phosphoric acid. The dilute solution of phosphoric acid will be between about 40% and 75% by weight. The proportion of each component is selected to provide a reaction product having a ratio of Na:Al:P of about 2:3:6.

BACKGROUND OF THE INVENTION

There are today known compounds classified as sodium aluminum acid orthophosphates. The compound of the formula, $NaAl_3H_{14}(PO_4)_8 \cdot 4H_2O$ (disclosed in U.S. Pat. No. 2,550,490), usually given the generic name sodium aluminum phosphate or simply SAP, is presently the most important commercial compound of the group. A more recent compound is the dehydrated form of SAP having the formula $NaAl_3H_{14}(PO_4)_8$, see U.S. Pat. No. 2,957,750. The amorphous compound of the formula $NaAl_3H_{11}(PO_4)_7 \cdot 5-8H_2O$ was disclosed in U.S. Pat. No. 2,995,421. Another compound of this class is formed by reacting sodium aluminum phosphorus in an atomic ratio of 3:3:8 to provide a crystalline structure having distinct X-ray powder diffraction lines, see U.S. Pat. No. 3,223,479. These known sodium aluminum acid orthophosphates are useful, for example, as leavening agents for a variety of baked goods, as milk controlling additives for cheese, and as fat binding additives for meat.

BRIEF DESCRIPTION OF THE INVENTION

A novel complex sodium aluminum acid orthophosphate has been discovered having an atomic ratio of sodium:aluminum:phosphorus of about 2:3:6. At room temperature it is in the form of finely divided, white particles. X-ray powder patterns show that the compound has a new crystalline structure. The compound has utility in the same general field as the prior art acid sodium aluminum acid orthophosphates, but with substantial differences in several chemical properties, especially those which effect its performance as a leavening acid.

DETAILED DESCRIPTION OF THE INVENTION

The alkali metal aluminum phosphate of the present invention is prepared by diluting phosphoric acid with water to provide a phosphoric acid solution ranging between about 40 up to about 75%. The acid solution is charged to a suitable reaction vessel equipped with a stirrer and a reflux condenser. Then, sufficient alkali metal carbonate, such as sodium carbonate, or alkali metal hydroxide, such as sodium hydroxide, or mixtures thereof, is charged to this phosphoric acid solution while agitating to provide an atomic ratio of 3 to 8. After the solution clears, an aluminum compound selected from the group consisting of aluminum hydroxide, aluminum oxide or mixtures thereof is charged to the mixture. A sufficient amount is added to give a final ratio of Na:Al:P of 3:2:8. The temperature of the reaction is adjusted to approximately 80 to 90° C. and maintained at this temperature for approximately six hours with agitation. After this period, the temperature is dropped to below about 60° C. and maintained at this temperature for approximately fifteen hours. The resulting slurry is poured into a filter and the solids removed from the liquids. The cake so recovered is immediately slurried with water and again filtered and repeated as necessary. Excess water in the filter cake is drawn off. The product is effectively dried at a temperature of about 110 to 115° C. to a constant weight. Cold water is used in the washing until the pH is above about 3.5. The material so formed has been identified as having an atomic ratio of sodium:aluminum:phosphorus of about 2:3:6.

The compound of the present invention may be quickly characterized by X-ray powder diffraction patterns, by virtue of its distinct crystalline lattice. The patterns of both prior art crystalline sodium aluminum acid orthophosphates differ from that of the new compound of the present invention as to the spacing and intensity of the measure lines of the patterns. For example, the d-spacings of the lines of greatest intensity of sodium aluminum phosphates, $NaAl_3H_{14}(PO_4)_8 \cdot 4H_2O_9$ referred to as SAP, are at 2.99, 3.67 and 8.70 angstroms while those of the new compounds of this invention are approximately 9.12, 7.78 and 3.07 angstroms. A similar difference can be seen when comparing the major lines of the dehydrated SAP, $NaAl_3H_{14}(PO)_4)_8$ referred to as DSAP, with a new compound of the present invention. Table I shows the d-spacings and the relative line intensities of the X-ray patterns of SAP, DSAP, and the composition of the present invention.

TABLE I

| Compound of the present invention | | SAP | | DSAP | |
|---|---|---|---|---|---|
| d, angstrom | Intensity | d, angstrom | Intensity | d, angstrom | Intensity |
| 9.12 | 100 | 8.70 | 100 | 8.64 | 40 |
| 7.78 | 35 | 7.50 | 10 | 7.73 | 100 |
| 7.50 | 5 | 4.74 | 5 | 4.83 | 15 |
| 6.27 | 5 | 4.25 | 5 | 4.11 | 1 |
| 5.78 | 5 | 3.67 | 100 | 3.92 | 15 |
| 5.68 | 5 | 3.21 | 40 | 3.74 | 50 |
| 4.82 | 5 | 3.08 | 15 | 3.61 | 30 |
| 4.54 | 15 | 2.99 | 75 | 3.51 | 30 |
| 4.34 | 15 | 2.82 | 30 | 3.14 | 10 |
| 4.16 | 10 | 2.77 | 20 | 2.99 | 25 |
| 3.91 | 10 | 2.73 | 20 | 2.88 | 5 |
| 3.79 | 25 | 2.43 | 25 | 2.75 | 5 |
| 3.54 | 5 | 2.38 | 5 | 2.55 | 20 |
| 3.47 | 10 | 2.22 | 5 | 2.42 | 20 |
| 3.36 | 15 | 2.14 | 15 | 1.91 | 3 |
| 3.23 | 20 | 2.02 | 30 | 1.82 | 3 |
| 3.07 | 40 | 1.91 | 30 | | |
| 2.97 | 5 | 1.83 | 5 | | |
| 2.90 | 10 | | | | |
| 2.85 | 10 | | | | |
| 2.75 | 10 | | | | |
| 2.71 | 5 | | | | |
| 2.67 | 5 | | | | |
| 2.59 | 5 | | | | |
| 2.45 | 5 | | | | |
| 2.41 | 10 | | | | |
| 2.33 | 5 | | | | |

The relative intensities of Table I are estimated from X-ray patterns by assigning values ranging from 0 for no lines, up to 100 for the lines of highest intensity.

In general, the compound of the present invention exhibits marked differences in chemical characteristics, and especially in leavening characteristics when compared to the complex sodium aluminum acid orthophosphates of the prior art. For example, the compound of the present invention has a slower "bench action" and a much lower degree of hygroscopicity than the sodium aluminum orthophosphates available heretofore. Each of these characteristics provides a material advantage in certain specific commercial applications of the leavening acid. Low bench action, for instance, is very desirable when preparing batters or doughs which are to be frozen or stored for any length of time. The retarded liberation of gas prevents "swelling" of the batter or dough during packaging and storage. In the preparation of cakes and other goods which do not require appreciable proofing before the baking operation, the low bench action of the new compound conserves leavening gas for later liberation at oven temperatures.

The following specific examples is illustrative of the preparation and properties of the compound of the invention.

EXAMPLE 1

2350 grams of 75% phosphoric acid is added to 1104 grams water in a 5 liter resin reaction flask fitted with a stirrer and reflux condenser. 360.8 grams of sodium carbonate is added and the temperature adjusted to 65° C. 356.4 grams of aluminum hydroxide is then added and the temperature is allowed to rise to 85–90° C. Crystallization is deemed complete in 24 hours.

EXAMPLE 2

In a reaction flask equipped with a stirrer and a reflux condenser was added 2350 grams of 75% phosphoric acid and 356.4 grams of aluminum hydroxide. Temperature was raised slowly to 95° C. and held there until the solution was clear. The clear solution was diluted at 65 to 70° C. with one liter of water containing ten milliliters of 75% phosphoric acid. A solution of 360.8 grams of sodium carbonate and 1440 grams of water was run into the stirred aluminum phosphate solution. The temperature of the resulting slurry was raised to about 85° C. and held there for 16 hours. The mother liquor is filtered off and the filter cake slurried with cold distilled water. The crystals were oven dried at 90 to 95° C. to near constant weight.

EXAMPLE 3

1033.8 grams of 85.2 weight percent phosphoric acid was diluted with 693.2 grams $H_2O$ and charged into a five liter resin reaction flask equipped with stirrer and reflux condenser. The 180.4 gram sodium carbonate was added (stirrer running) with care to keep foaming under control. After carbon dioxide ceased to be evolved, the temperature was raised and 178.2 grams aluminum hydroxide was started in at 65° C. The temperature was maintained below 90° C. during the addition. After the solution cleared, slow stirring was maintained and the temperature was held in the range 80–86° C. for six hours and then at 48–50° C. for 17 hours during which period of time, a finely divided crystalline precipitate formed. The slurry was transferred to a suction filter and the mother liquor was filtered off. The filter cake was broken up and dispersed in distilled water and the resulting slurry was transferred to the filter and the wash removed. Washing was continued, with distilled water, on the filter until the filtrate reached a pH above 4. The solid product was dried at 90° C. to constant weight of 305.7 grams.

What is claimed is:
1. A novel complex crystalline sodium aluminum acid orthophophate useful as a leavening agent which has an atomic ratio of sodium:aluminum:phosphorus of about 2:3:6, and which exhibits X-ray diffraction lines of major intensity at d-spacings of approximately 9.12, 7.78, and 3.07 angstroms.

2. A process for preparing a complex crystalline sodium aluminum acid orthophosphate having an atomic ratio of sodium:aluminum:phosphorus of about 2:3:6, said process comprising:
   (a) reacting the compounds selected from the group consisting of sodium hydroxide and sodium carbonate and a reacted trivalent inorganic aluminum compound with aqueous phosphoric acid;
   (b) heating the resultant reaction mixture between 45° C. and 100° C. until a crystalline product forms; and
   (c) recovering the crystalline product.

3. A process according to claim 2, wherein the phosphoric acid is a dilute solution between about 40% and 75% by weight and the crystalline product is recovered by filtration.

References Cited
UNITED STATES PATENTS 3,410,804    11/1968    Walsh _____ 23—105

FOREIGN PATENTS 733,893    5/1966    Canada _____ 23—105

OSCAR R. VERTIZ, Primary Examiner

H. S. MILLER, Assistant Examiner

U.S. Cl. X.R.

99—95